United States Patent [19]
Kamiyama et al.

[11] Patent Number: 5,971,031
[45] Date of Patent: Oct. 26, 1999

[54] BRANCH PIPE LINER BAG AND PIPE LINING METHOD

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shona Gosei-jushi Seiksakusho K.K., Kanagawa-ken; Yokoshima & Co., Ibaraki-ken; GET INC; OAR Company, both of Saitama-ken, all of Japan

[21] Appl. No.: 09/165,277

[22] Filed: Oct. 2, 1998

[30] Foreign Application Priority Data

Oct. 6, 1997 [JP] Japan .................................. 9-272672

[51] Int. Cl.⁶ .................................................. F16L 55/16
[52] U.S. Cl. .............................. 138/98; 138/97; 156/287; 264/269
[58] Field of Search ........................ 138/98, 97; 156/287; 264/269, 267; 405/150.1

[56] References Cited

U.S. PATENT DOCUMENTS

| | | | |
|---|---|---|---|
| 3,968,552 | 7/1976 | Hunter | 138/98 X |
| 4,238,264 | 12/1980 | Pelton | 156/269 X |
| 5,329,063 | 7/1994 | Endoh | 138/98 |
| 5,439,033 | 8/1995 | Kamiyama et al. | 138/98 |
| 5,451,284 | 9/1995 | Ikeda et al. | 156/287 X |
| 5,454,401 | 10/1995 | Kamiyama et al. | 138/98 |
| 5,498,389 | 3/1996 | Kamiyama et al. | 264/269 X |
| 5,566,719 | 10/1996 | Kamiyama et al. | 138/98 |
| 5,598,873 | 2/1997 | Kamiyama et al. | 138/98 |
| 5,692,543 | 12/1997 | Wood | 138/98 |
| 5,778,937 | 7/1998 | Sundermann | 138/98 X |

*Primary Examiner*—Patrick Brinson
*Attorney, Agent, or Firm*—Whitham, Curtis & Whitham

[57] ABSTRACT

An economical branch pipe liner bag is provided. The branch pipe liner bag allows for a reduction in manufacturing cost, stabilized quality, and mass-production, and does not have any portion to be wasted when used. One end of a tubular resin absorbent material impregnated with an unhardened hardenable resin is outwardly folded and pressed to form an extension which is sandwiched between separate flange forming members to form a flange at the one end of the tubular resin absorbent material, thus constructing the branch pipe liner bag. Since the branch pipe liner bag has the flange formed at one end by integrally coupling the flange forming members, which are members separate from the tubular resin absorbent material, the flange forming members can be mechanically mass-produced independently of the tubular resin absorbent material, with the result that a manufacturing cost of these flange forming members is reduced, and consequently a manufacturing cost of the branch pipe liner bag is reduced.

25 Claims, 13 Drawing Sheets

BRANCH PIPE LINER BAG AND PIPE LINING METHOD

BACKGROUND OF THE INVENTION

1. Field of the Invention

The present invention relates generally to branch pipe lining techniques, and more particularly, to a branch pipe liner bag for lining the inner wall of a branch pipe. The present invention is also directed to a pipe lining method for lining a branch pipe and a main pipe.

2. Description of the Related Art

When a branch pipe of passageways or the like is lined, a branch pipe liner bag 101 having a flange 106 formed on one end thereof, as illustrated in FIG. 12, is used. The flange 106 is kept in close contact with the periphery of a branch pipe opening (a portion of a branch pipe 121 open to a main pipe 120) of a main pipe (sewerage line) 120, and the branch pipe liner bag 101 is everted upwardly into the branch pipe 121 by a fluid pressure, as indicated by broken lines in FIG. 12.

Then, after the branch pipe liner bag 101 is fully everted into the branch pipe 121, the branch pipe liner bag 101 is kept pressed onto the inner wall of the branch pipe 121, and a thermosetting resin impregnated in the branch pipe liner bag 101 is hardened. In this way, the branch pipe 121 is lined with the hardened branch pipe liner bag 101.

Conventionally, the branch pipe liner bag 101 has been manufactured by outwardly folding one end of a tubular resin absorbent material made of unwoven fabric or the like, impregnating a hardenable resin into the folded portion, and hardening the impregnated hardenable resin to integrally form the flange 106 (see, for example, Japanese Patent No. 2,528,430).

However, since the conventional branch pipe liner bag 101 is integrally formed with the flange 106 at one end thereof, its manufacturing must rely on manual works of craftsmen. This form of manufacturing implies problems of inaptitude for stabilized quality and mass production as well as a high manufacturing cost.

In addition, when branch pipe liner bags are to be manufactured for stock, they are manufactured slightly longer than actual lengths thereof so as to support a variety of different lengths of branch pipes. Therefore, during a lining operation, a branch pipe liner bag is cut to the actual length of a branch pipe which is to be lined, so that a portion of a branch pipe liner bag is wasted without serving for lining, causing a problem from an economical point of view.

Incidentally, when the branch pipe 121 has been lined as illustrated in FIG. 12, a main pipe liner bag 133 is everted into the main pipe 120 by a fluid pressure as illustrated in FIG. 13. Then, after the eversion of the main pipe liner bag 133 into the main bag 120 is completed, a hardenable resin impregnated in the main pipe liner bag 133 is hardened to line the main pipe 120. Finally, a portion of the main pipe liner bag 133 blocking the branch pipe opening is cut by a cutter, not shown, to allow the branch pipe 121 to communicate with the main pipe 120, as illustrated in FIG. 14, thus completing a sequence of lining operations for the branch pipe 121 and the main pipe 120.

In the conventional pipe lining method mentioned above, however, since the flange 106 of the branch pipe liner bag 101 is not always joined completely with the main pipe liner bag 133, underground water or the like is likely to introduce into the pipes from the joint of the flange 106 and the main pipe liner bag 133.

OBJECTS AND SUMMARY OF THE INVENTION

It is therefore an object of the present invention to provide an economical branch pipe liner bag which allows for a reduction in manufacturing cost, stabilized quality, and mass production, and which has no portion to be wasted when it is used.

It is another object of the present invention to provide a pipe lining method which is capable of integrally joining a flange of a branch pipe liner bag with a main pipe liner bag to ensure that water is prevented from introducing from a joint of them.

To achieve the above object, according to one aspect of the present invention, there is provided a branch pipe liner bag comprising a tubular resin-absorbent material impregnated with an unhardened hardenable resin, the tubular resin-absorbent material having one end outwardly folded to form an extension at the one end; and a flange including at least two flange forming members for sandwiching the extension therebetween to form the flange at the one end of the tubular resin absorbent material, the flange forming members being manufactured as members separate from the tubular resin absorbent material.

In the branch pipe liner bag, the flange forming members may be molded in an arcuate shape conforming to the inner surface of a main pipe. Also, the flange forming members may be made of metal or plastic, and integrally coupled by bolts and nuts. Further, the flange forming members may be formed with at least one resin filling hole. The flange forming members may further be formed with resin moving spaces.

The extension formed at one end of the tubular resin absorbent material may be air-tight sandwiched by the flange forming members. The upper and lower surfaces of the extension formed at one end of the tubular resin absorbent material may be roughly finished.

One of the flange forming members may be formed on the inner periphery thereof with a cylindrical protrusion along the tubular resin absorbent material, where the protrusion has an outer diameter smaller than an inner diameter of a branch pipe. The other of the flange forming members may be formed with cylindrical main pipe liner bag thickness reducing means on the inner periphery thereof which extends along the tubular resin absorbent material. A tear tube, a barrier liner, a start liner or a packing material may be sandwiched between the tubular resin absorbent material and the flange forming members.

The tubular resin absorbent material may comprise a multi-layer structure, and a highly air-tight plastic film is thermally welded over each of inner and outer surfaces of the multi-layer structure.

According to another aspect of the present invention, there is provided a pipe lining method comprising the steps of providing a branch pipe liner bag impregnated with an unhardened hardenable resin, the branch pipe liner bag formed by folding outwardly one end of a tubular resin absorbent material impregnated with the unhardened hardenable resin, and pressing an edge portion of the folded tubular resin absorbent material to form an extension, sandwiching the extension between at least two flange forming members, the flange forming members being members separate from the tubular resin absorbent material, to form a flange at the one end of the tubular resin absorbent material; providing a main pipe liner bag comprising a tubular resin absorbent material having its outer peripheral surface covered with a highly air-tight film, the tubular resin absorbent material impregnated with an unhardened hardenable resin; everting and inserting the branch pipe liner bag into a branch pipe from a main pipe by a fluid pressure with the flange maintained pressed onto the periphery of a branch pipe opening of a main pipe; hardening the hardenable resin impregnated in the branch pipe liner bag with the branch pipe liner bag maintained pressed onto the inner wall of the branch pipe to perform lining for the branch pipe; everting and inserting the main pipe liner bag into the main pipe by a fluid pressure; and hardening the hardenable resin impregnated in the main pipe liner bag with the main pipe liner bag maintained pressed onto the inner wall of the main pipe to perform lining for the main pipe.

The step of providing the branch pipe liner bag may include forming resin filling holes and resin moving spaces in flange forming members constituting the flange of the branch pipe liner bag; and the step of hardening may include filling the hardenable resin oozing from the branch pipe liner bag in the resin moving spaces through the resin filling holes formed through the flange forming members of the branch pipe liner bag, with the branch pipe liner bag maintained pressed onto the inner wall of the main pipe, and hardening the hardenable resin filled in the resin moving spaces.

The step of providing the branch pipe liner bag may include forming main pipe liner bag thickness reducer reducing means extending from the inner periphery of one of the flange forming members, and the pipe lining method may further comprise the step of cutting a portion of the main pipe liner bag surrounded by the main pipe liner bag thickness reducing means of the branch pipe liner bag by applying impact to the portion, after finishing the lining of the main pipe liner bag.

As will be appreciated, the branch pipe liner bag according to the present invention has a flange formed at one end thereof by integrally combining a plurality of flange forming members, which are members made separately from the tubular resin absorbent material, so that the flange forming members can be mechanically mass-produced independently of the tubular resin absorbent material, resulting in a lower manufacturing cost of the flange forming members and hence a reduction in manufacturing cost of the branch pipe liner bag.

When the branch pipe liner bag is manufactured, the flange can be formed by sandwiching an extension formed at one end of the tubular resin absorbent material between the separately mass-produced flange forming members and integrally combining them, so that the branch pipe liner bag can be readily manufactured without relying on expert craftsmen, thereby making it possible to stably provide high quality branch pipe liner bag.

Further, the tubular resin absorbent materials and the flange forming members may be manufactured separately and stored as stock, and a tubular resin absorbent material is cut to a length equal to an actual branch pipe at a site, and the flange is formed by sandwiching one end of the cut tubular resin absorbent material between the flange forming members each time a pipe lining operation is performed. It is therefore unnecessary to cut a branch pipe liner bag, manufactured longer than the length of an actual branch pipe, to meet the length of the actual branch pipe during a lining operation, as has been conventionally done, thus eliminating a useless portion of the branch pipe liner bag to be wasted. This is advantageous from an economical point of view, and can reduce a cost of the branch pipe liner bag 1 as a result.

According to the pipe lining method according to the present invention, since the branch pipe liner bag capable of reducing a manufacturing cost, providing a stabilized quality, and adapting to the mass-production is employed for operating the lining for a branch pipe, so that the lining operations including the lining of the main pipe can be carried out at a lower cost.

Also, in the pipe lining method according to the present invention, since the thickness reducer of the branch pipe liner bag frets in the outer peripheral surface of the main pipe liner bag to locally reduce the thickness of a predetermined portion of the main pipe liner bag, this portion can be broken by acting an external force thereon, thereby making it possible to accurately and readily form an opening along the shape of the thickness reducer through the main pipe liner bag.

Further, in the pipe lining method according to the present invention, since the unhardened liquid hardenable resin impregnated in the main pipe liner bag oozes from the outer peripheral surface of the main pipe liner bag during the lining for the main pipe, and a portion of the oozing resin flows through the resin filling holes formed through the flange of the branch pipe liner bag into the resin moving spaces and is hardened therein as it is. This enables the flange of the branch pipe liner bag to be firmly coupled with the main pipe liner bag to ensure that water is prevented from introducing from a joint of the flange and the main pipe liner bag.

DESCRIPTION OF THE PREFERRED EMBODIMENTS

The present invention will hereinafter be described in connection with several preferred embodiments thereof with reference to the accompanying drawings.

Figure 1:
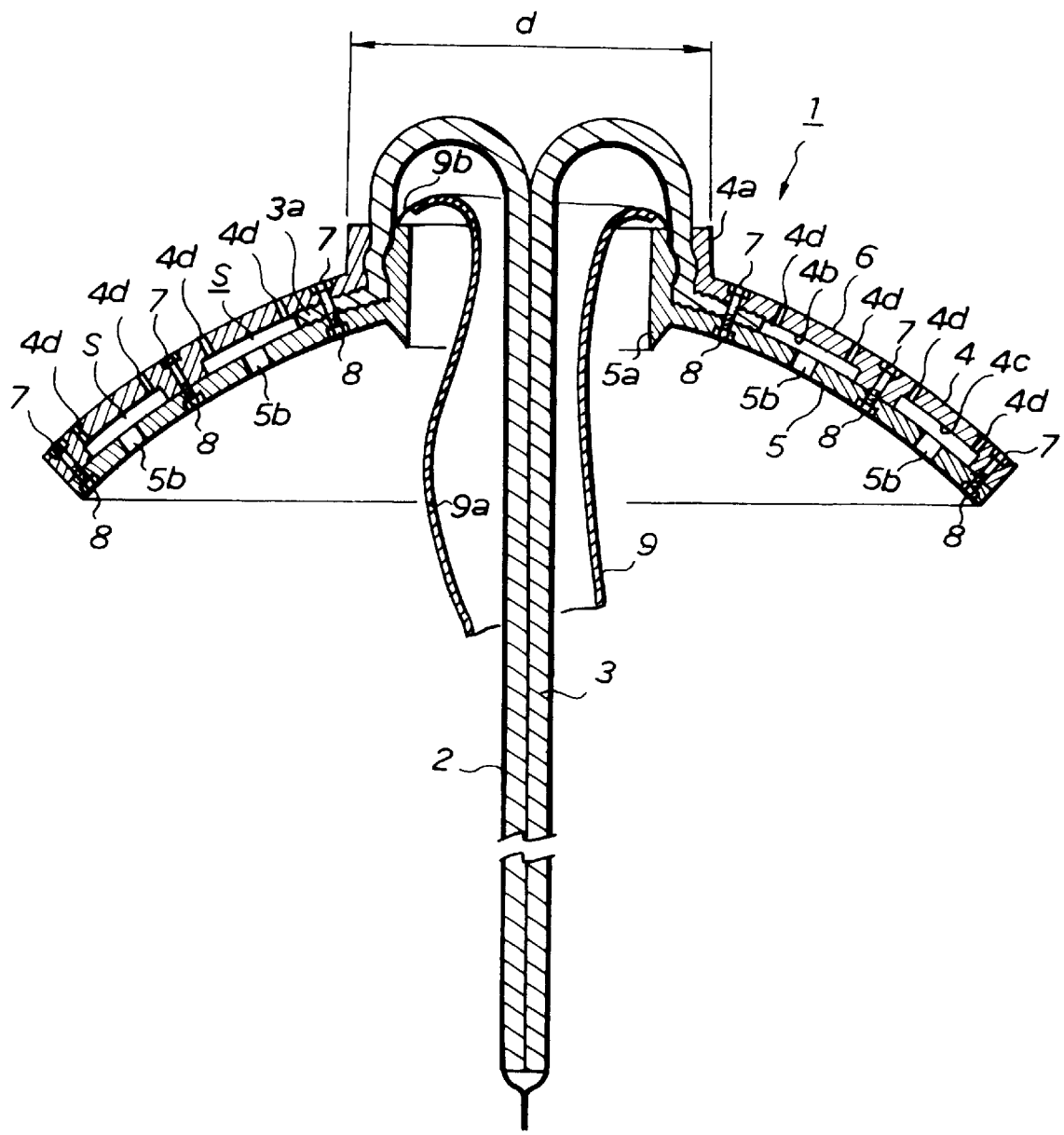
FIG. 1 is a cross-sectional view illustrating a branch pipe liner bag according to one embodiment of the present invention.

FIG. 1 is a cross-sectional view illustrating a branch pipe liner bag 1 according to one embodiment of the present invention. As illustrated, the branch pipe liner bag 1 has a tubular resin absorbent material 3 having its outer peripheral surface covered with a highly air-tight plastic film 3. The plastic film 3 may comprise a film made of polyethylene, vinyl chloride, vinylon, polyurethan, nylon, polypropylene, copolymer of polyethylene—nylon, or the like. The tubular resin absorbent material 3 may be made of unwoven fabric such as polyester, nylon, acrylic fabric, vinylon, or the like.

Describing the illustrated branch pipe liner bag 1 in greater detail, the tubular resin absorbent material 3 has one end (the upper end in FIG. 1) outwardly folded, and a peripheral portion of the folded material is outwardly pressed to form a ring-like extension 3a. If it is difficult to press the folded portion of the tubular resin absorbent material 3 to extend outwardly when the tubular resin absorbent material 3 is formed with the extension 3a, a plurality of slits may be cut into that portion in its lengthwise direction.

The extension 3a formed in the folded peripheral portion at one end of the tubular resin absorbent material 3 is air-tight sandwiched by two ring-like upper and lower flange forming members 4, 5, thereby forming a flange 6 at the one end of the tubular resin absorbent material 3. It should be noted that flange forming members are members separate from the tubular resin absorbent material 3. The upper and lower surfaces of the extension 3a of the tubular resin absorbent material 3 are roughly finished to produce larger friction between the extension 3a and the flange forming members 4, 5, so that the flange forming members 4, 5 are prevented from coming off the extension 3a.

Figure 3:
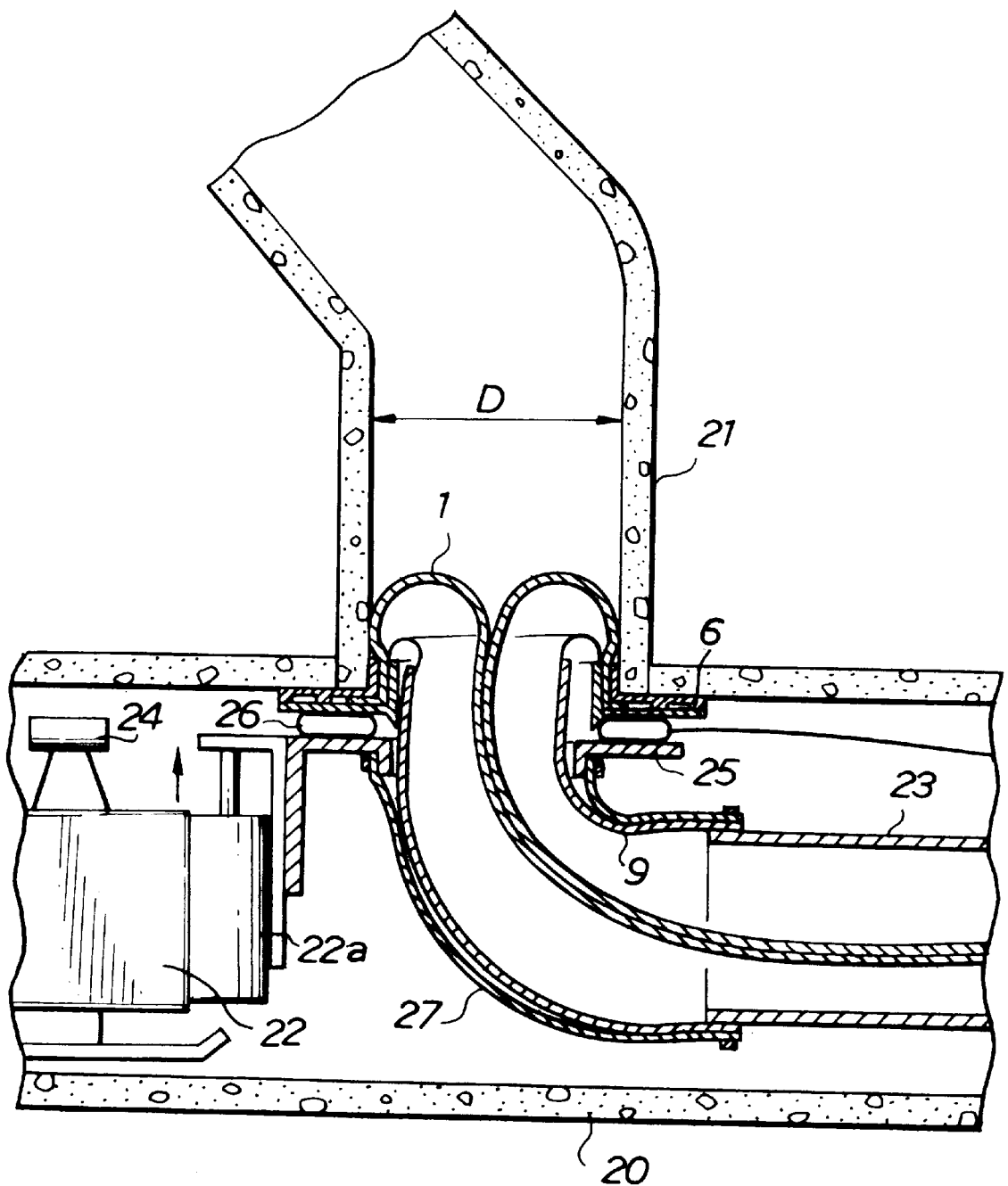
FIGS. 3–9 are cross-sectional views illustrating various steps of a pipe lining method according to one embodiment of the present invention.

The flange forming members 4, 5 are made of a metal or plastic material and molded in an arcuate shape conforming to the inner peripheral surface of a main pipe 20 illustrated in FIG. 3. The flange forming members 4, 5 are integrated together with bolts 7 extending through the members 4, 5 and nuts 8 engaged with the bolts 7 at three positions in a radial direction (a position near the inner periphery, a position near the outer periphery, and an intermediate position therebetween). The flange forming members 4, 5 are mechanically mass-produced independently (separately from the resin absorbent material) by a plastic molding method (injection method), press machining, die cast method, or the like.

Along the upper flange forming member 4, a cylindrical protrusion 4a is formed upwardly along the outer peripheral surface of the folded portion of the tubular resin absorbent material 3. The protrusion 4a is continuous and protruding from the upper flange forming member 4, and has an outer diameter d which is set smaller than the inner diameter D of a branch pipe 21 illustrated in FIG. 3 (d<D).

The upper flange forming member 4 is formed with two concentric ring-like grooves 4b, 4c in its lower surface, and a plurality of vent holes 4d in communication with the grooves 4b, 4c.

The lower flange forming member 5, in turn, is integrally formed with a cylindrical main pipe liner bag thickness reducer 5a extending from the inner periphery thereof. The main pipe thickness reducer 5a extends along the inner peripheral surface of the folded portion of the tubular resin absorbent material 3, and one end of a tear tube 9 is sandwiched between the thickness reducer 5 of the lower flange forming member 5 and the tubular resin absorbent material 3. The thickness reducer 5a has a sharp knife-like edge formed along its lower periphery. The tear tube 9 is composed of a tube made of unwoven fabric having its inner surface covered with a plastic tube 9b. As illustrated, one end of the tear tube 9 is folded out, and a plastic tube 9b extending from the end of the outwardly folded portion only is sandwiched between the thickness reducer 5a of the flange forming member 5 and the tubular resin absorbent material 3.

In addition, the lower flange forming member 5 is formed therethrough with a plurality of resin filling holes 5b concentrically arranged on circles having different radii.

Figure 4:
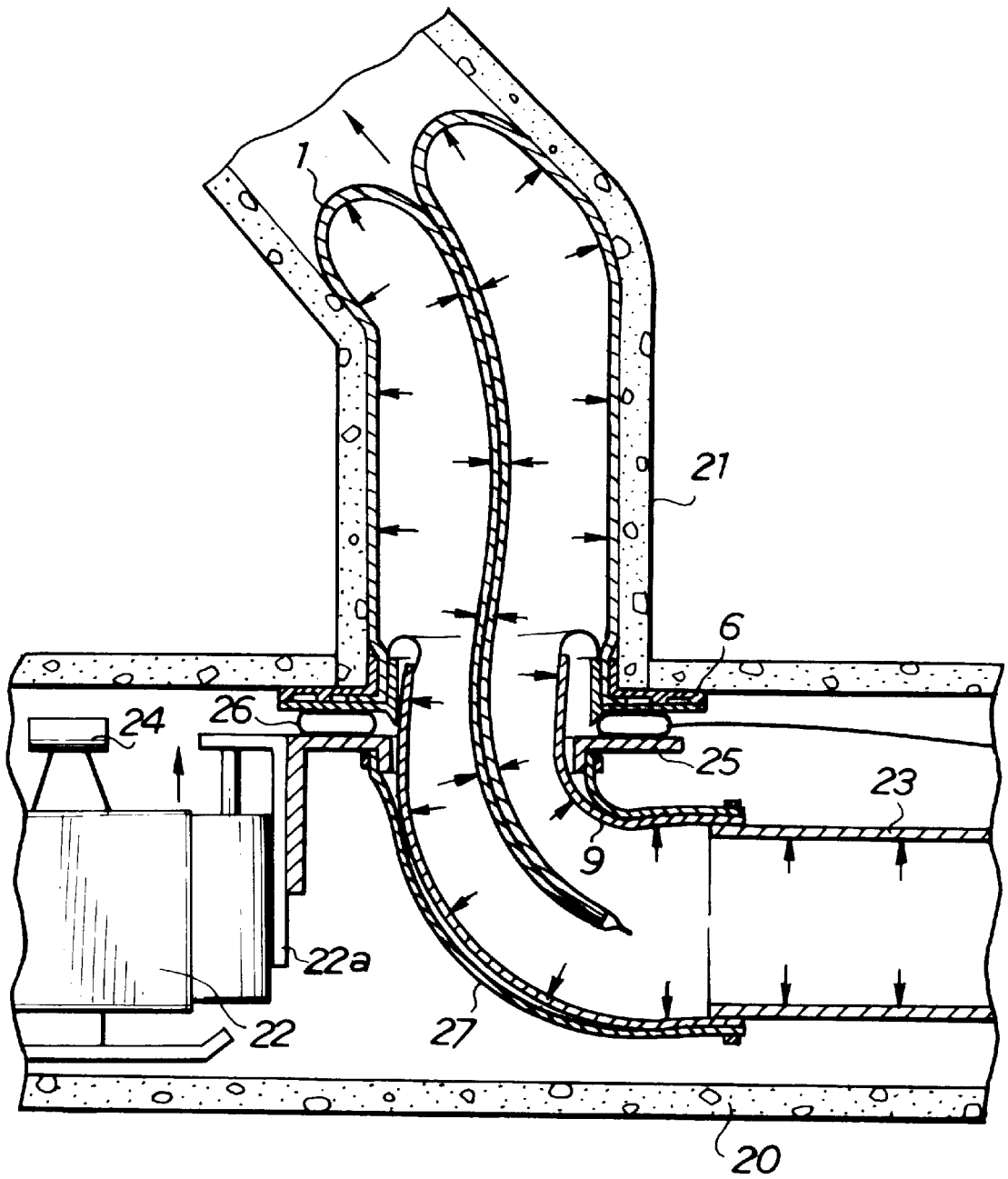

In a flange formed at one end of the tubular resin absorbent material 3 by sandwiching the extension 3a formed at one end of the tubular resin absorbent material 3 between the flange forming members 4, 5, and integrally combining the flange forming members 4, 5 with the bolts 7 and the nuts 8, as described above, ring-like resin moving spaces S are defined by the grooves 4b formed in the lower surface of the upper flange forming member 4 and the lower flange forming member 5 between the flange forming members 4, 5, as illustrated in FIG. 4, and the resin filling holes 5b bored through the lower flange forming member 5 are open to the resin moving spaces S.

As described above, the branch pipe liner bag 1 according to this embodiment is formed at one end thereof with the flange 6 using the upper and lower flange forming members 4, 5, which are members manufactured separately from the tubular resin absorbent material 3. The other end of the branch pipe liner bag 1 is sealed by the plastic film 2.

As will be appreciated, since the branch pipe liner bag 1 according to this embodiment has the flange 6 formed by combining the upper and lower flange forming members 4, 5, which are members separate from the tubular resin absorbent material 3, the flange forming members 4, 5 can be mechanically mass-produced by a plastic molding method (injection method), press machining, die cast method, or the like, independently of the manufacturing of the tubular resin absorbent material 3, thereby making it possible to reduce a manufacturing cost of these members and consequently a manufacturing cost of the branch pipe liner bag 1.

In addition, for manufacturing the branch pipe liner bag 1, the flange 6 can be formed by sandwiching the extension 3a formed at one end of the tubular resin absorbent material 3 between the separately mass-produced flange forming members 4, 5 and integrally combining them with the bolts 7 and nuts 8, so that the branch pipe liner bag 1 can be readily manufactured without relying on expert craftsmen, thereby making it possible to ensure stable provision of high-quality branch pipe liner bags.

Further, the tubular resin absorbent materials 3 and the flange forming members 4, 5 may be manufactured separately and stored as stock, and a tubular resin absorbent material 3 is cut to a length equal to an actual branch pipe 21 at a site, and the flange 6 is formed by sandwiching one end of the cut tubular resin absorbent material 3 between the flange forming members 4, 5 each time a pipe lining operation is performed. It is therefore unnecessary to cut a branch pipe liner bag, manufactured longer than the length of an actual branch pipe, to match the length of the actual branch pipe during a lining operation, as has been conventionally done, thus eliminating a useless portion of the branch pipe liner bag 1 to be wasted. This is advantageous from an economical point of view, and can reduce a cost of the branch pipe liner bag 1 as a result.

Figure 2:
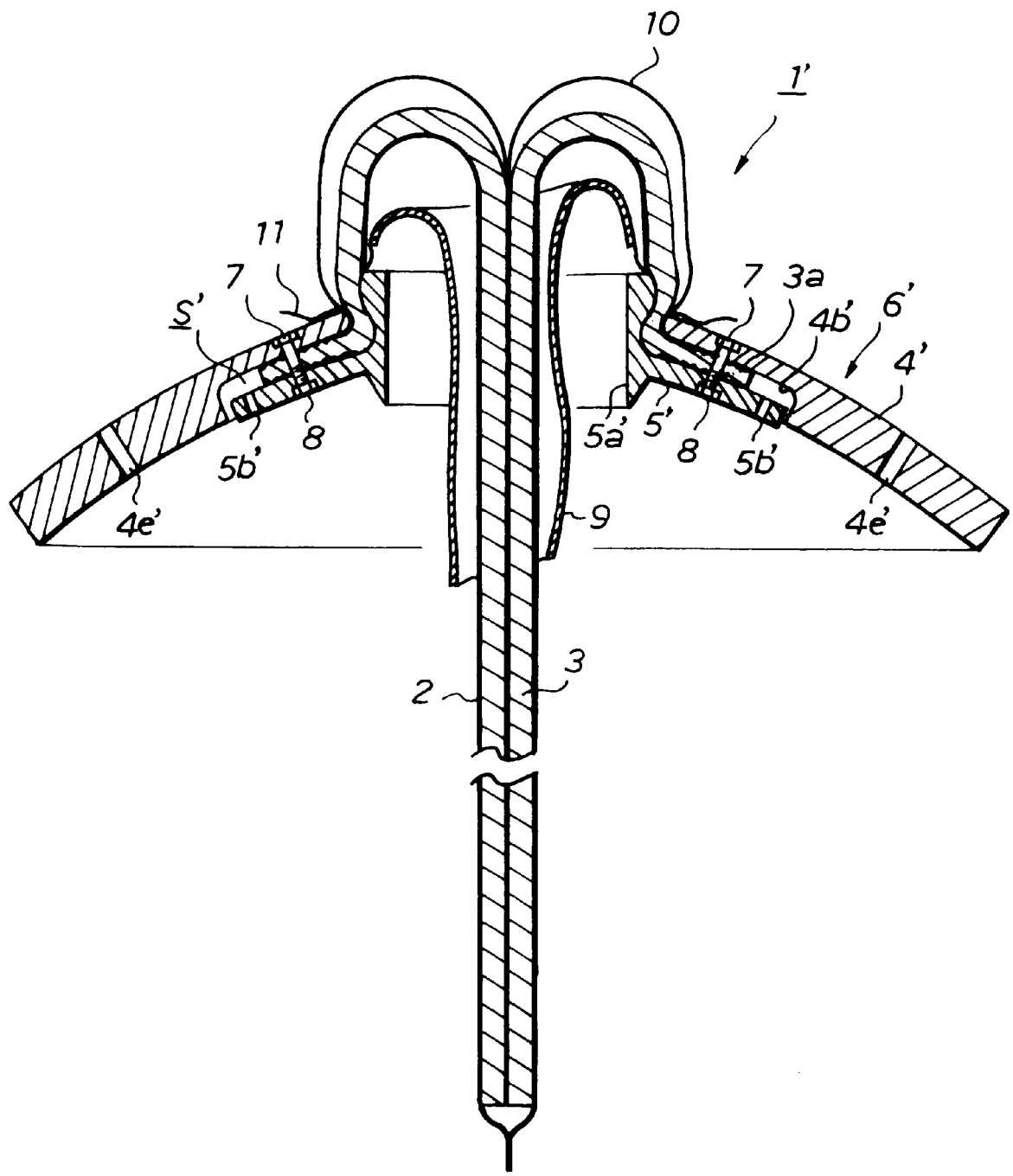
FIG. 2 is a cross-sectional view illustrating a branch pipe liner bag according to another embodiment of the present invention.

Next, another embodiment of the branch pipe liner bag according to the present invention is illustrated in FIG. 2. FIG. 2 is a cross-sectional view of a branch pipe liner bag 1' according to another embodiment, where the same elements as those illustrated in FIG. 1 are designated the same reference numerals, and explanation of these same elements are omitted.

The branch pipe liner bag 1' illustrated in FIG. 2 is also formed at one end thereof with a flange 6' by sandwiching an extension 3a formed at one end of a tubular resin absorbent material 3 between upper and lower flange forming members 4', 5', which are separate members. The outer diameter of the lower flange forming member 5' is smaller than that of the upper flange forming member 4'. The lower flange forming member 5' is inserted into a recess 4b' formed near the inner periphery of a lower surface of the upper flange forming member 4' to sandwich the extension 3a of the tubular resin absorbent material 3 together with the recess 4b'. The upper and lower flange forming members 4', 5' are integrally coupled using bolts 7 and nuts 8. The upper and lower surfaces of the extension 3a of the tubular resin absorbent material 3 are roughly finished to produce larger friction between the extension 3a and the flange forming members 4', 5', so that the flange forming members 4', 5' are prevented from coming off the extension 3a. The flange forming members 4', 5' are mechanically mass-produced independently of the tubular resin absorbent material 3 by a plastic molding method (injection method), press machining, die cast method, or the like.

Ring-like resin moving spaces S' are defined by grooves 4b' formed in the lower surface of the upper flange forming member 4' and the lower flange forming member 5', and a plurality of resin filling holes 5b' bored through the lower flange forming member 5' are open to the resin moving spaces S'. In addition, a main pipe liner bag thickness reducer 5a' is formed integrally with the inner periphery of the lower flange forming member 5'.

The upper flange forming member 4' is further formed therethrough with a plurality of resin filling holes 4e', and a tubular barrier liner or start liner 10 and a packing material 11, covering the inner surface of the tubular resin absorbent material 3, are sandwiched between an inner peripheral portion of the flange forming member 4' and the tubular resin absorbent material 3.

Though not shown, the tubular resin absorbent material 3 may be of a multi-layer structure, and a highly air-tight plastic film may be thermally welded over the inner and outer surfaces thereof.

Next, a pipe lining method according to one embodiment of the present invention performed using the branch pipe liner bag 1 illustrated in FIG. 1 and a main pipe liner bag 33, later described (see FIG. 8), will be described with reference to FIGS. 3–11. FIGS. 3–9 and 11 are cross-sectional views illustrating in order various steps of the pipe lining method according to the present invention, and FIG. 10 is an enlarged view illustrating in detail a portion A in FIG. 9.

First, a branch pipe lining method performed using the branch pipe liner bag 1 illustrated in FIG. 1 will be described with reference to FIGS. 3–7.

Prior to performing the branch pipe lining method, an unhardened liquid hardenable resin is impregnated into the tubular resin absorbent material 3 of the branch pipe liner bag 1 by a known method. For the hardenable resin, a thermosetting resin such as unsaturated polyester resin, epoxy resin, vinyl ester resin, or the like may be used.

Referring to FIG. 3, there are a main pipe 20 and a branch pipe 21 confluent to the main pipe 20 in which a work robot 22, a pressure bag 23, and so on have been introduced. The work robot 22 may be hydraulically driven and has a television camera 24 for monitoring positioned on the top.

The aforementioned branch pipe liner bag 1 has been inserted into pressure bag 23, with the open end of the tear tube 9 of the branch pipe liner bag 1 being attached to the pressure bag 23. The flange 6 formed at one end of the branch pipe liner bag 1 is supported by a setting arm 25 removably mounted to a head 22a of the work robot 22. An air mat 26 is arranged between the flange 6 and the setting arm 25.

The setting arm 25 and the bag 23 are coupled through a guide tube 27 which has a length set shorter than the length of the tear tube 9.

In the configuration described above, the work robot 22, the pressure bag 23, and so on are integrally moved within the main pipe 20 by pulling a pull rope, not shown, and -the flange 6 of the branch pipe liner bag 1 is positioned in registration with an opening of the branch pipe 21, as illustrated in FIG. 3, while monitoring the state inside the main pipe 20 by a monitor on the ground through the television camera 24. In this event, the protrusion 4a (see FIG. 1) protrusively formed on the inner surface of the upper flange forming member 4 constituting the flange 6 of the branch pipe liner bag 1 fits into the opening of the branch pipe 21 to function as a guide for positioning the branch pipe liner bag 1.

Next, when a compressor, not shown, is driven to supply the pressure bag 23 and the air mat 26 with compressed air, the air mat 26 inflates as illustrated in FIG. 3 to bring the flange 6 of the branch pipe liner bag 1 in close contact with the periphery of the opening of the branch pipe 21.

As compressed air is supplied into the pressure bag 23 as illustrated in FIG. 4, the branch pipe liner bag 1 within the pressure bag 23 is everted and inserted into the branch pipe 21 from the main pipe 20 to the ground with the pressure of the compressed air.

Figure 5:
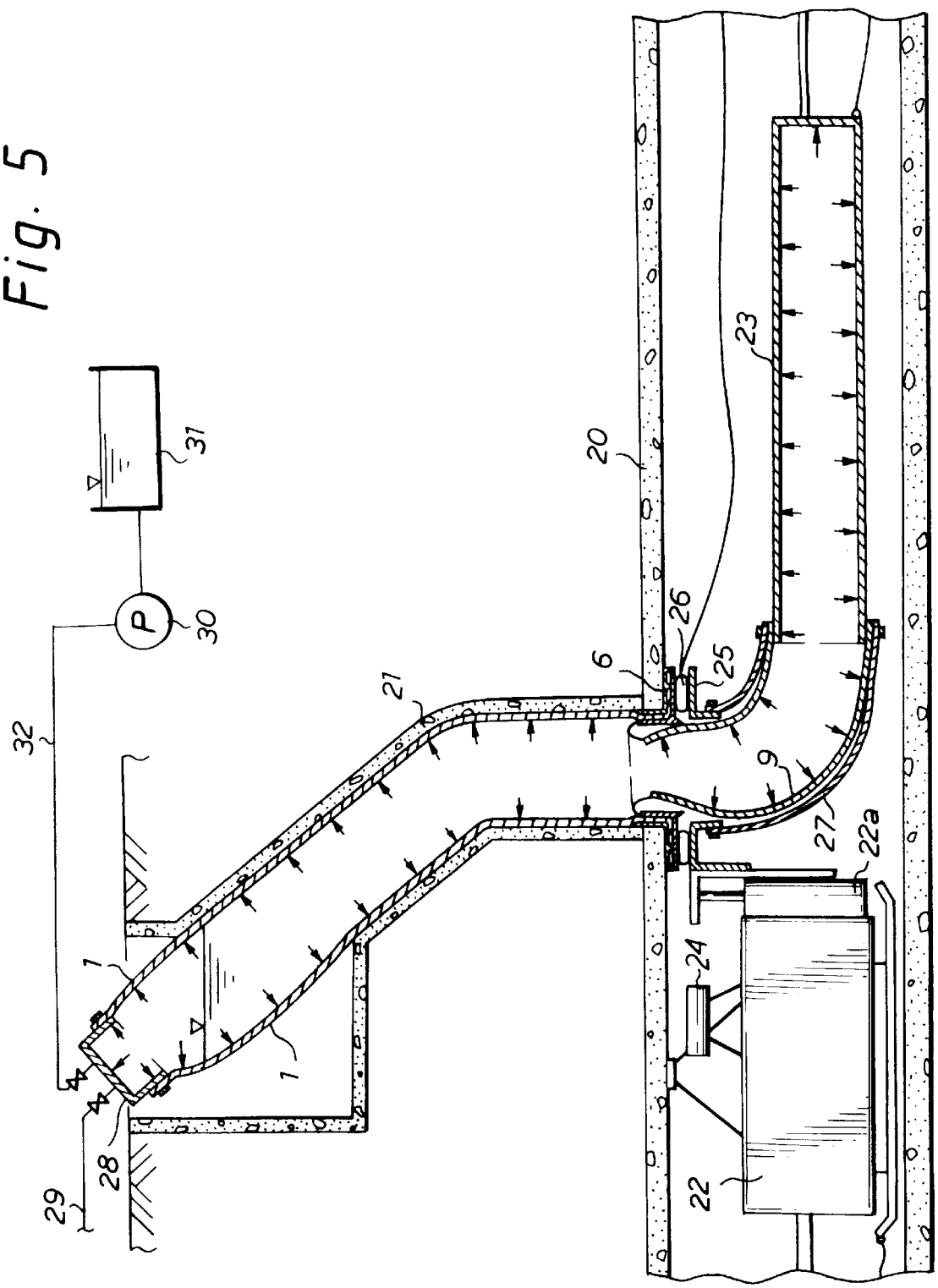

When the branch pipe liner bag 1 is fully inserted into the branch pipe 21, a cup 28 is attached to the open end of the branch pipe 1 as illustrated in FIG. 5, and compressed air is supplied into the branch pipe liner bag 1 from an air hose 29 connected to the cup 28 to press the branch pipe liner bag 1 onto the inner wall of the branch pipe 21. With this state maintained, as a pump 30 is driven to supply hot water stored in a hot water tank 31 into the branch pipe liner bag 1 through a hot water hose 32, the thermosetting resin impregnated in the branch pipe liner bag 1 (tubular resin absorbent material 3) is hardened by the heat of the hot water, with the result that the inner wall of the branch pipe 21 is lined by the hardened branch pipe Liner bag 1, i.e., repaired and reinforced.

Figure 6:
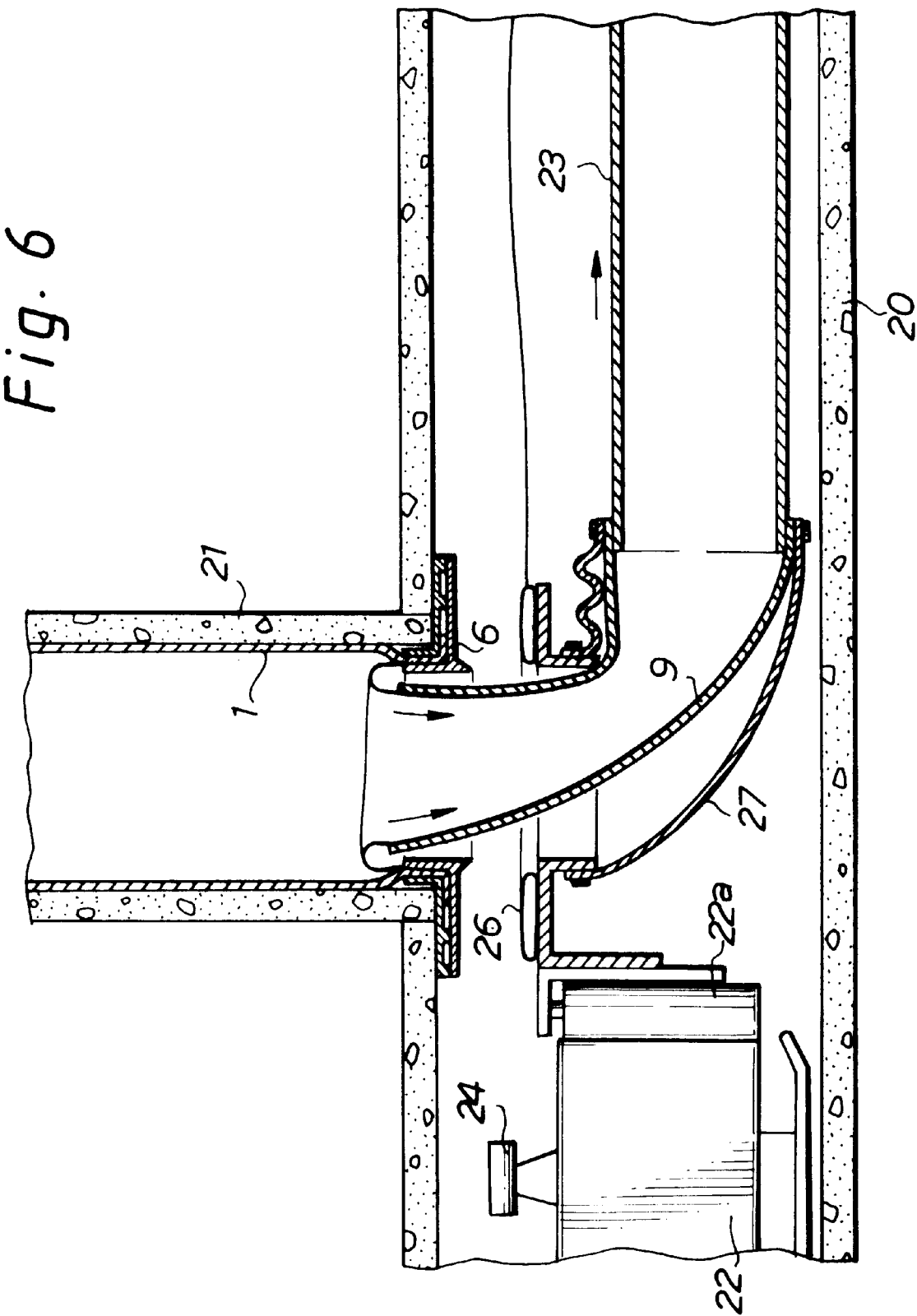
Figure 7:
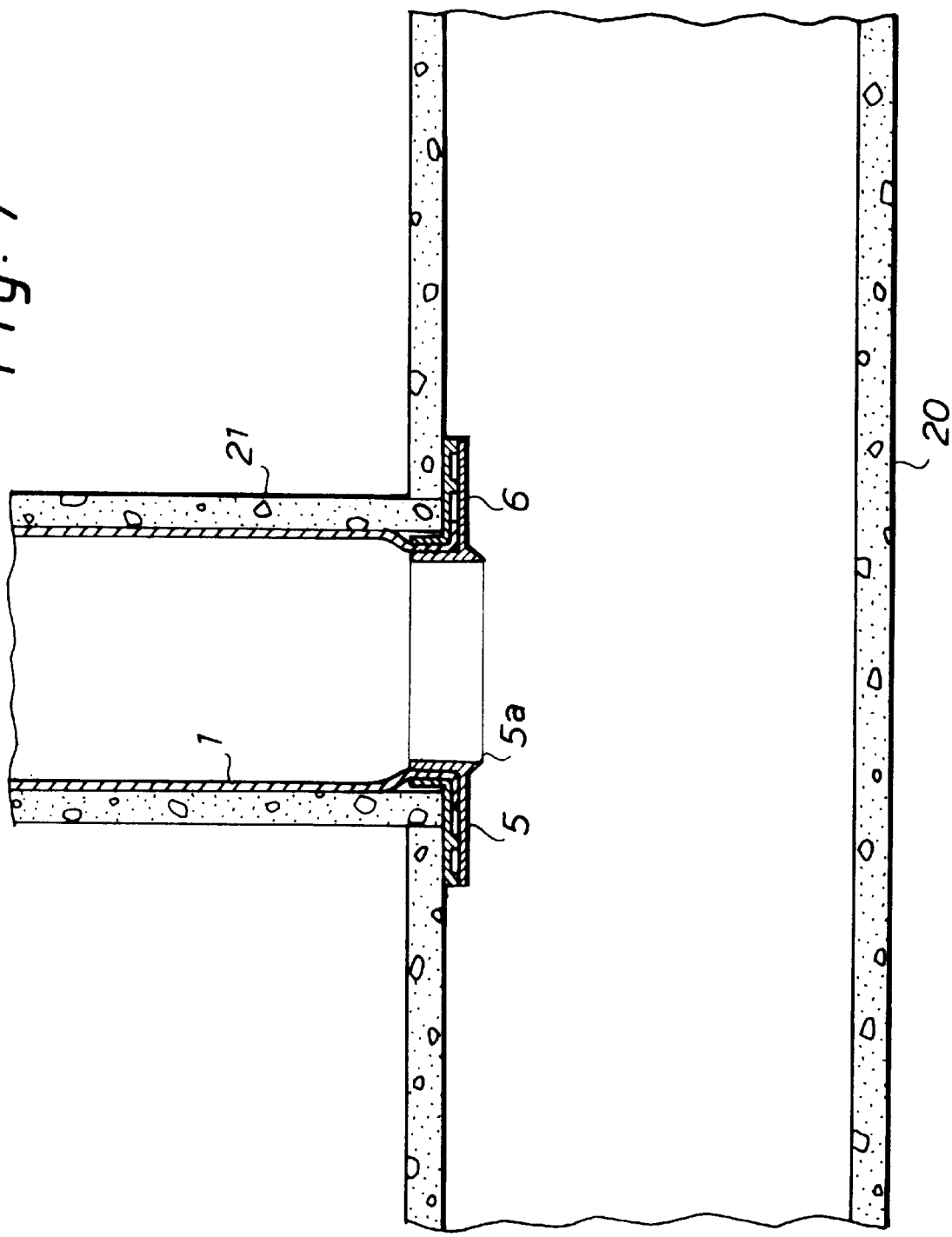

When the branch pipe 21 is lined as described above, the hot water within the branch pipe liner bag 1 is drawn out, and the pressure bag 23 is pulled by a pull rope, not shown, in the direction indicated by the arrow (to the right) in FIG. 6. Since the pressure bag 23 and the work robot 22 are coupled through the guide tube 27, the work robot 22 is also moved within the main pipe 20 integrally with the pressure bag 23, and the tear tube 9 sandwiched between the flange 6 (flange forming member 5) of the branch pipe liner bag 1 and the tubular resin absorbent material 3 is torn away from a plastic tube portion 9b (see FIG. 1) at the end thereof. The torn tear tube 9 is moved within the main pipe 20 together with the pressure bag 23 and so on, and removed from the main pipe 20 for withdrawal, as illustrated in FIG. 7.

Subsequently, the hardened branch pipe liner bag 1 only remains within the branch pipe 21, thus completing a sequence of branch pipe lining operations. At this time, in the flange 6 of the branch pipe liner bag 1, the main pipe liner bag thickness reducer 5a formed integrally with the inner wall of the flange forming member 5 protrudes into the main pipe 20, as illustrated.

As the branch pipe 21 has been lined as described above, the main pipe 20 is then lined. In the following, a main pipe lining method will be described with reference to FIGS. 8–11.

Figure 8:
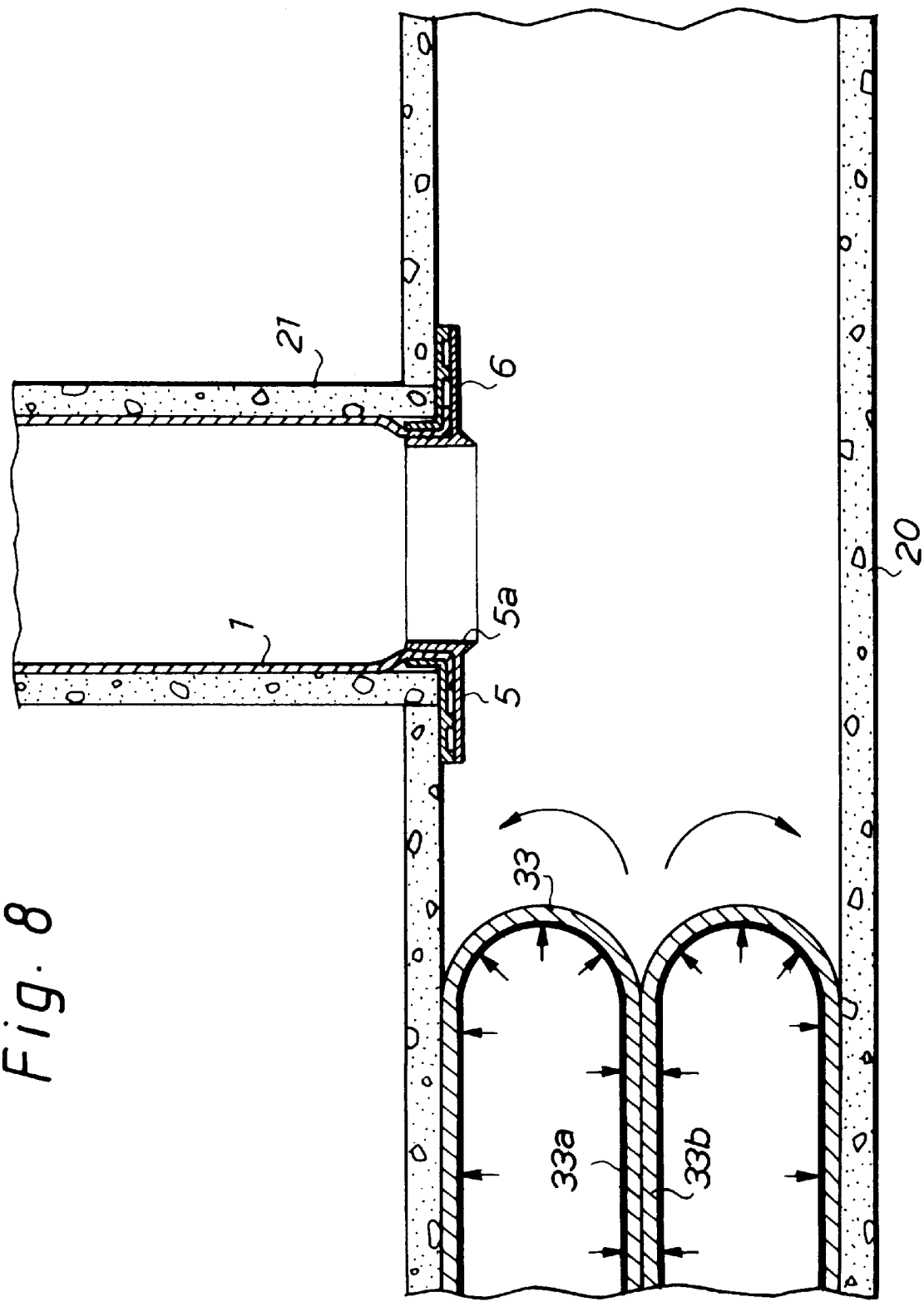

For lining the main pipe 20, a main pipe liner bag 33 is everted and inserted into the main pipe 20 by a fluid pressure such as compressed air or the like, as illustrated in FIG. 8. The main pipe liner bag 33 comprises a tubular resin absorbent material 33b having its outer peripheral surface covered with a highly air-tight plastic film 33a and impregnated with an unhardened liquid hardenable resin (thermosetting resin in this embodiment). For the plastic film 33a, the tubular resin absorbent material 33b, and the liquid hardenable resin, similar ones to those used for the branch pipe liner bag 1 may be used.

Figure 9:
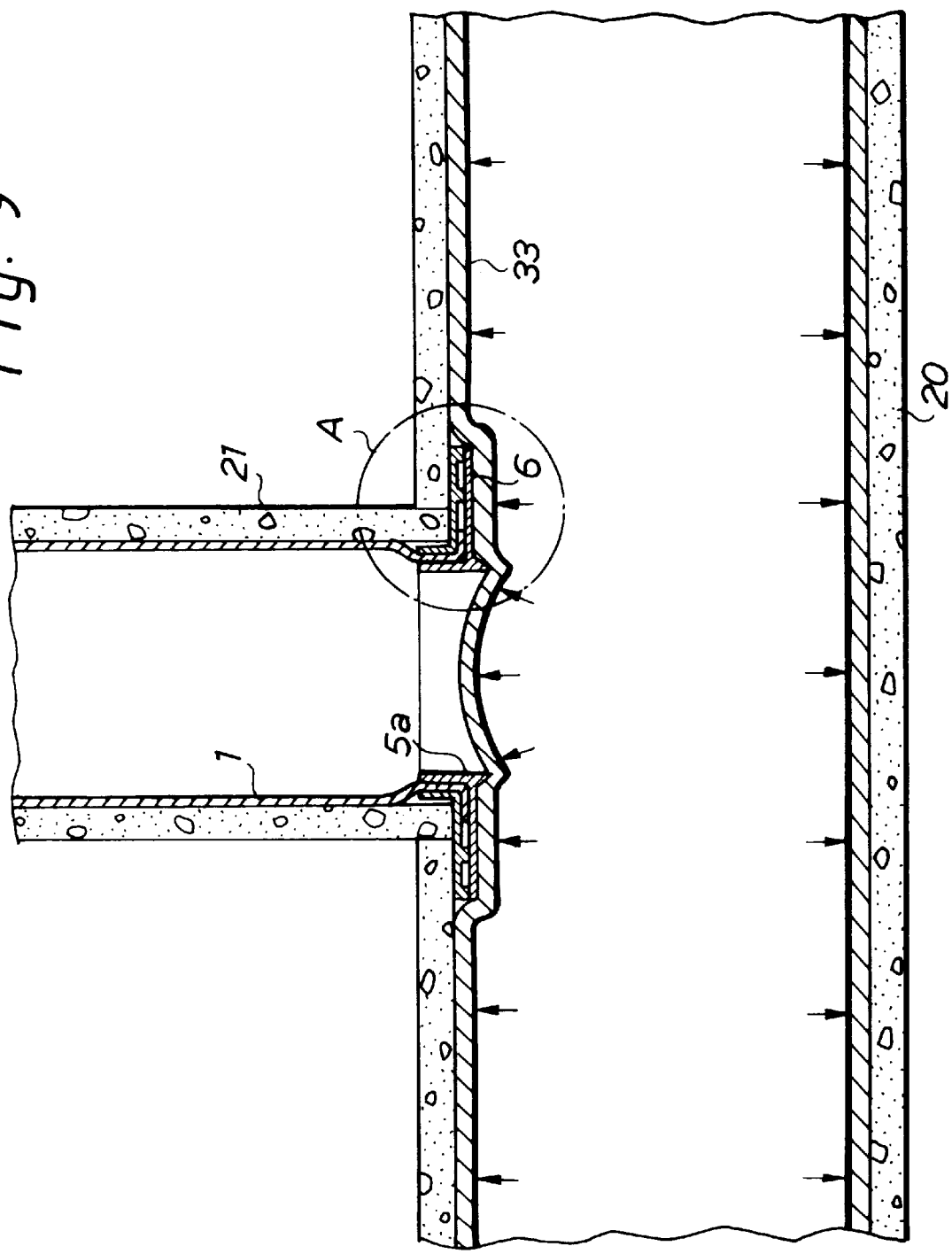
Figure 10:
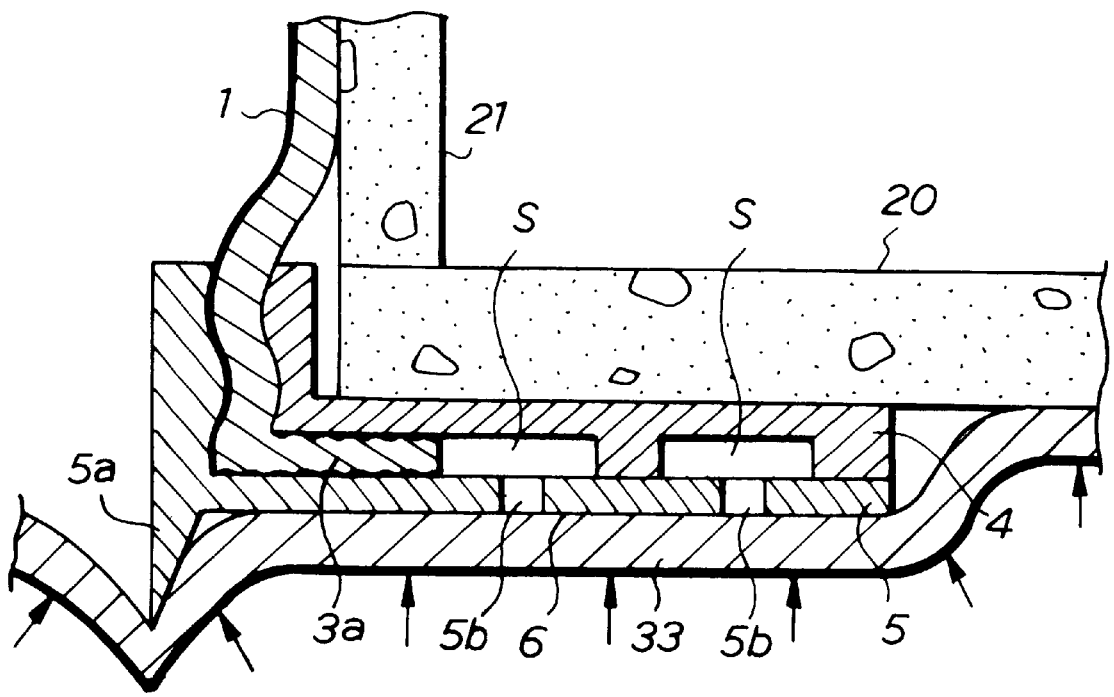
FIG. 10 is an enlarged view illustrating in detail a portion A in FIG. 9.

When the main pipe liner bag 33 has been inserted into the main pipe 20 over the entire length thereof as illustrated in FIG. 9, a fluid pressure is supplied to act inside the main pipe liner bag 33 to press the main pipe liner bag 33 onto the inner wall of the main pipe 20. This causes the sharp edge of the thickness reducer 5a of the branch pipe liner bag 1 to come into contact with the outer peripheral surface of the main pipe liner bag 33, and also causes the tip of the sharp edge of the thickness reducer 5a to fret in the outer peripheral surface of the main pipe liner bag 33 to locally reduce the thickness of that portion of the main pipe liner bag 33.

When the main pipe liner bag 33 is pressed onto the inner wall of the main pipe 30 by a fluid pressure as mentioned above, the unhardened liquid hardenable resin impregnated in the main pipe liner bag 33 oozes from the outer peripheral surface of the main pipe liner bag 33, and a portion of the oozing liquid hardenable resin flows into the resin moving spaces S through the resin filling holes 5b formed through the flange 6 of the branch pipe liner bag 1.

Subsequently, when the main pipe liner bag 33 is heated by an arbitrary heating means to harden the thermosetting resin impregnated therein, with the main pipe liner bag 33 left pressed onto the inner wall of the main pipe 20, the inner wall of the main pipe 20 is lined, i.e., repaired by the hardened main pipe liner bag 33. In this event, since the portion of the main pipe liner bag 33 having a locally reduced thickness is hardened as it is, and therefore has a lower strength than the remaining portion.

Figure 11:
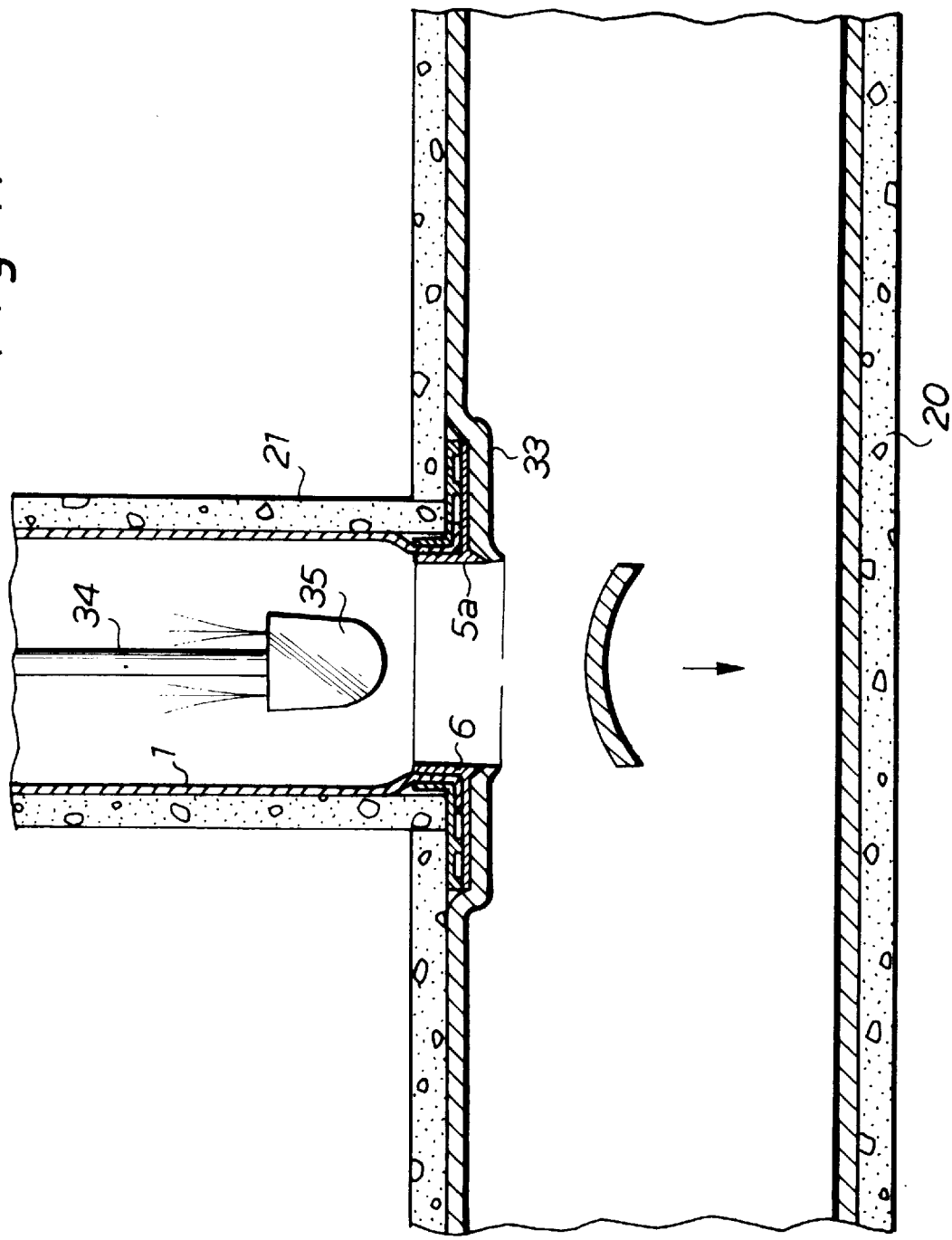
FIG. 11 is a cross-sectional view illustrating a further step of the pipe lining method.
Figure 12:
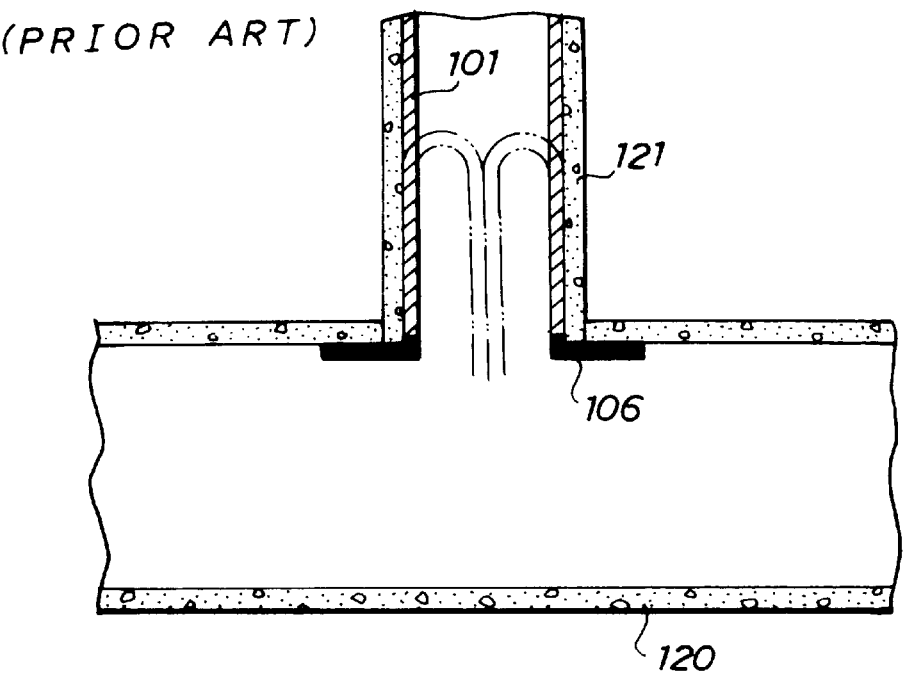
FIGS. 12–14 are cross-sectional views illustrating several steps of a conventional pipe lining method.
Figure 13:
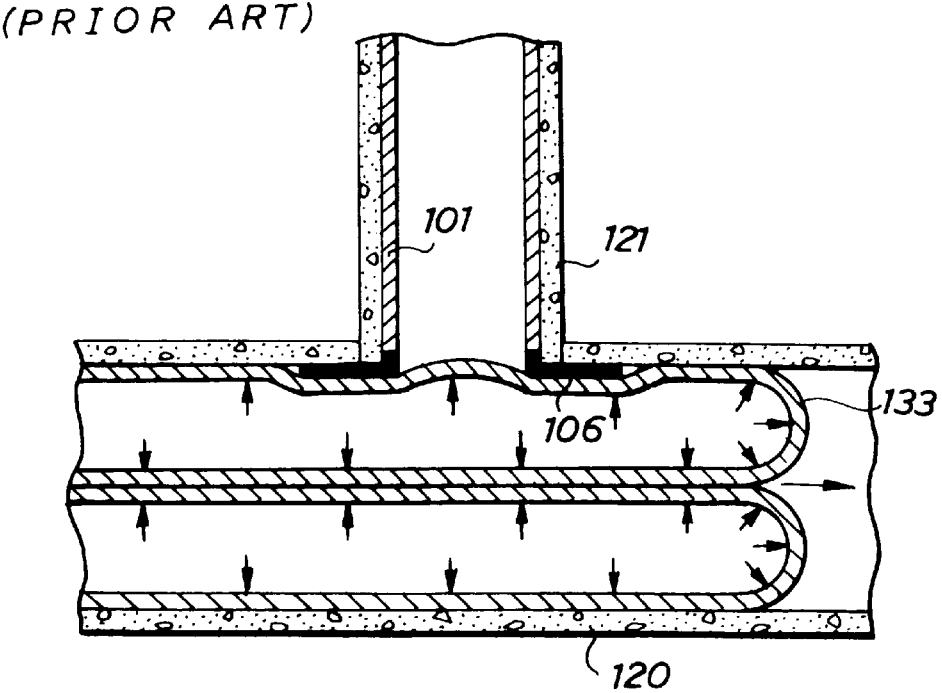
Figure 14:
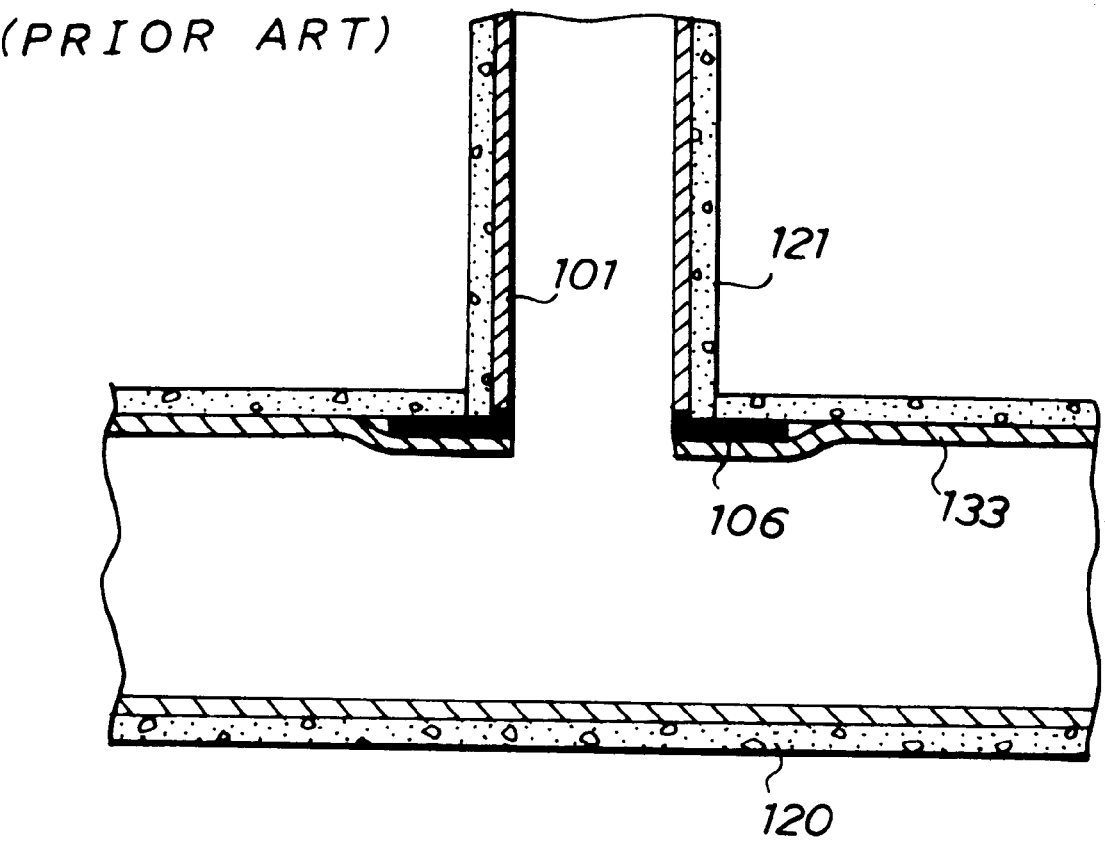

Then, as illustrated in FIG. 11, a high-pressure retro-jet nozzle attached to the tip of a high water pressure hose 34 is inserted into the branch pipe 21 from the ground, and high pressure water is supplied to the high pressure hose 34 to have the high pressure water to retro-jet from the rear end surface of the high pressure water retro-jet nozzle 35. Since the high pressure water retro-jet nozzle 35 moves downwardly due to a reaction of the retro-jetted high pressure water to apply impact to a portion of the main pipe liner bag 33 blocking the branch pipe opening (a portion surrounded by the thickness reducer of the branch pipe liner bag 33), so that a high stress is locally generated in the thickness reduced portion of the main pipe liner bag 33 to break this portion. Consequently, the portion of the main pipe liner bag 33 blocking the branch pipe opening is cut away in a circular shape and dropped. As a result, the branch pipe 21 is open to the main pipe 20 and both pipes are in communication with each other, thus completing the lining for the branch pipe 21 and the main pipe 20.

Since the pipe lining method according to the present invention employs the branch pipe liner bag 1 which allows for a reduction in manufacturing cost, stable quality, and mass-production, the lining operation including the lining of the main pipe can be carried out at a low cost.

Also, in the pipe lining method according to the present invention, since the thickness reducer 5a of the branch pipe liner bag 1 frets in the outer peripheral surface of the main pipe liner bag 33 to locally reduce the thickness of a predetermined portion of the main pipe liner bag 3, this portion can be broken by acting an external force thereon, thereby making it possible to accurately and readily form an opening along the shape of the thickness reducer 5a through the main pipe liner bag 33. It will therefore be appreciated that the hardened main pipe liner bag 33 can be bored with high operability and high accuracy to communicate the branch pipe 21 with the main pipe 20, without introducing degraded working environment and lower operability due to a manual opening operation using a conventional cutting tool or a remotely controlled opening operation using a special robot for this purpose.

Further, since the unhardened liquid hardenable resin impregnated in the main pipe liner bag 3 oozes from the outer peripheral surface of the main pipe liner bag 33 during the lining for the main pipe 20, and a portion of the oozing resin flows by way of the resin filling holes 5b formed through the flange 6 of the branch pipe liner bag 1 into the resin moving spaces S and is hardened therein as it is. This enables the flange 6 of the branch pipe liner bag 1 to be firmly coupled with the main pipe liner bag 33 to ensure that water is prevented from introducing from a joint of the flange 6 and the main pipe liner bag 33.

As is apparent from the foregoing description, the branch pipe liner bag according to the present invention has a flange formed at one end thereof by integrally combining a plurality of flange forming members, which are members made separately from the tubular resin absorbent material, so that the flange forming members can be mechanically mass-produced independently of the tubular resin absorbent material, resulting in a lower manufacturing cost of the flange forming members and hence a reduction in manufacturing cost of the branch pipe liner bag.

When the branch pipe liner bag is manufactured, the flange can be formed by sandwiching an extension formed at one end of the tubular resin absorbent material between the separately mass-produced flange forming members and integrally combining them, so that the branch pipe liner bag can be readily manufactured without relying on expert craftsmen, thereby making it possible to stably provide high quality branch pipe liner bag.

Further, the tubular resin absorbent materials and the flange forming members may be manufactured separately and stored as stock, and a tubular resin absorbent material is cut to a length equal to an actual branch pipe at a site, and the flange is formed by sandwiching one end of the cut tubular resin absorbent material between the flange forming members each time a pipe lining operation is performed. It is therefore unnecessary to cut a branch pipe liner bag, manufactured longer than the length of an actual branch pipe, to meet the length of the actual branch pipe during a lining operation, as has been conventionally done, thus eliminating a useless portion of the branch pipe liner bag to be wasted. This is advantageous from an economical point of view, and can reduce a cost of the branch pipe liner bag 1 as a result.

According to the pipe lining method according to the present invention, since the branch pipe liner bag capable of reducing a manufacturing cost, providing a stabilized quality, and adapting to the mass-production is employed for operating the lining for a branch pipe, so that the lining operations including the lining of the main pipe can be carried out at a lower cost.

Also, in the pipe lining method according to the present invention, since the thickness reducer of the branch pipe liner bag frets in the outer peripheral surface of the main pipe liner bag to locally reduce the thickness of a predetermined portion of the main pipe liner bag, this portion can be broken by acting an external force thereon, thereby making it possible to accurately and readily form an opening along the shape of the thickness reducer through the main pipe liner bag.

Further, in the pipe lining method according to the present invention, since the unhardened liquid hardenable resin impregnated in the main pipe liner bag oozes from the outer peripheral surface of the main pipe liner bag during the lining for the main pipe, and a portion of the oozing resin flows through the resin filling holes formed through the flange of the branch pipe liner bag into the resin moving spaces and is hardened therein as it is. This enables the flange of the branch pipe liner bag to be firmly coupled with the main pipe liner bag to ensure that water is prevented from introducing from a joint of the flange and the main pipe liner bag.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A branch pipe liner bag comprising:
   a tubular resin-absorbent material impregnated with an unhardened hardenable resin, said tubular resin-absorbent material having one end outwardly folded to form an extension at said one end; and
   a flange including at least two flange forming members for sandwiching said extension therebetween to form said flange at the one end of said tubular resin absorbent material, said flange forming members being manufactured as members separate from said tubular resin absorbent material.

2. A branch pipe liner bag according to claim 1, wherein said flange forming members are molded in an arcuate shape conforming to the inner surface of a main pipe.

3. A branch pipe liner bag according to claim 1, wherein said flange forming members are made of metal or plastic.

4. A branch pipe liner bag according to claim 1, wherein said flange forming members are integrally coupled by bolts and nuts.

5. A branch pipe liner bag according to claim 1, wherein said flange forming members are formed with at least one resin filling hole.

6. A branch pipe liner bag according to claim 1, wherein said flange forming members are formed with resin moving spaces.

7. A branch pipe liner bag according to claim 1, wherein said extension formed at one end of said tubular resin absorbent material is air-tight sandwiched by said flange forming members.

8. A branch pipe liner bag according to claim 1, wherein upper and lower surfaces of said extension formed at one end of said tubular resin absorbent material are roughly finished.

9. A branch pipe liner bag according to claim 1, wherein one of said flange forming members is formed on the inner periphery thereof with a cylindrical protrusion along said tubular resin absorbent material, said protrusion having an outer diameter smaller than an inner diameter of a branch pipe.

10. A branch pipe liner bag according to claim 9, wherein the other of said flange forming members is formed with cylindrical main pipe liner bag thickness reducing means on the inner periphery thereof, said reducing means being extending along said tubular resin absorbent material.

11. A branch pipe liner bag according to claim 1, wherein a tear tube, a barrier liner, a start liner or a packing material is sandwiched between said tubular resin absorbent material and said flange forming members.

12. A branch pipe liner bag according to claim 1, wherein said tubular resin absorbent material comprises a multi-layer structure, and a highly air-tight plastic film is thermally welded over each of inner and outer surfaces of said multi-Layer structure.

13. A pipe lining method comprising the steps of:
   providing a branch pipe liner bag impregnated with an unhardened hardenable resin, said branch pipe liner bag formed by folding outwardly one end of a tubular resin absorbent material impregnated with the unhardened hardenable resin, and pressing an edge portion of the folded tubular resin absorbent material to form an extension, sandwiching said extension between at least two flange forming members, said flange forming members being members separate from said tubular resin absorbent material, to form a flange at said one end of said tubular resin absorbent material;
   providing a main pipe liner bag comprising a tubular resin absorbent material having its outer peripheral surface covered with a highly air-tight film, said tubular resin absorbent material impregnated with an unhardened hardenable resin;
   everting and inserting said branch pipe liner bag into a branch pipe from a main pipe by a fluid pressure with said flange maintained pressed onto the periphery of a branch pipe opening of a main pipe;
   hardening said hardenable resin impregnated in said branch pipe liner bag with said branch pipe liner bag maintained pressed onto the inner wall of the branch pipe to perform lining for the branch pipe;
   everting and inserting said main pipe liner bag into the main pipe by a fluid pressure; and
   hardening said hardenable resin impregnated in said main pipe liner bag with said main pipe liner bag maintained pressed onto the inner wall of the main pipe to perform lining for the main pipe.

14. A pipe lining method according to claim 13, wherein:
   said step of providing said branch pipe liner bag includes forming resin filling holes and resin moving spaces in flange forming members constituting said flange of said branch pipe liner bag; and
   said step of hardening includes filling said hardenable resin oozing from said branch pipe liner bag in said resin moving spaces through said resin filling holes formed through said flange forming members of said branch pipe liner bag, with said branch pipe liner bag maintained pressed onto the inner wall of said main pipe, and hardening said hardenable resin filled in said resin moving spaces.

15. A pipe lining method according to claim 14, wherein said step of providing said branch pipe liner bag includes forming main pipe liner bag thickness reducing means extending from the inner periphery of one of said flange forming members, and said pipe lining method further comprising the step of cutting a portion of said main pipe liner bag surrounded by said main pipe liner bag thickness reducing means of said branch pipe liner bag by applying impact to said portion, after finishing the lining of said main pipe liner bag.

16. A branch pipe liner bag according to claim 2, wherein said flange forming members are made of metal or plastic.

17. A branch pipe liner bag according to claim 2, wherein said flange forming members are integrally coupled by bolts and nuts.

18. A branch pipe liner bag according to claim 3, wherein said flange forming members are integrally coupled by bolts and nuts.

19. A branch pipe liner bag according to claim 2, wherein said flange forming members are formed with at least one resin filling hole.

20. A branch pipe liner bag according to claim 3, wherein said flange forming members are formed with at least one resin filling hole.

21. A branch pipe liner bag according to claim 4, wherein said flange forming members are formed with at least one resin filling hole.

22. A branch pipe liner bag according to claim 2, wherein said flange forming members are formed with resin moving spaces.

23. A branch pipe liner bag according to claim 3, wherein said flange forming members are formed with resin moving spaces.

24. A branch pipe liner bag according to claim 4, wherein said flange forming members are formed with resin moving spaces.

25. A branch pipe liner bag according to claim 5, wherein said flange forming members are formed with resin moving spaces.

* * * * *